United States Patent
Larsson

(10) Patent No.: US 10,733,090 B1
(45) Date of Patent: Aug. 4, 2020

(54) MEMORY MANAGEMENT IN A SYSTEM WITH DISCRETE MEMORY REGIONS

(71) Applicant: Amazon Technologies, Inc., Seattle, WA (US)

(72) Inventor: Jonas Daniel Larsson, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 121 days.

(21) Appl. No.: 14/536,251

(22) Filed: Nov. 7, 2014

(51) Int. Cl.
*G06F 12/02* (2006.01)
*G06T 1/60* (2006.01)

(52) U.S. Cl.
CPC ............ *G06F 12/0223* (2013.01); *G06T 1/60* (2013.01); *G06F 2212/254* (2013.01)

(58) Field of Classification Search
CPC ........... G06F 12/0223; G06F 2212/254; G06F 12/02; G06T 1/60
See application file for complete search history.

(56) References Cited

U.S. PATENT DOCUMENTS

| | | | |
|---|---|---|---|
| 6,401,181 B1* | 6/2002 | Franaszek | G06F 12/1009 707/999.202 |
| 7,376,808 B2* | 5/2008 | Cascaval | G06F 12/10 703/13 |
| 8,924,677 B2* | 12/2014 | Pronovost | G06F 12/02 345/535 |
| 2007/0250604 A1* | 10/2007 | Wu | H04L 12/00 709/220 |
| 2014/0204102 A1* | 7/2014 | Rath | G06T 1/20 345/522 |

OTHER PUBLICATIONS

Eureka Technology EP420 64-bit PCI Host Bridge (Year: 2000).*

* cited by examiner

*Primary Examiner* — David Yi
*Assistant Examiner* — Zubair Ahmed
(74) *Attorney, Agent, or Firm* — Lowenstein Sandler LLP

(57) ABSTRACT

A memory management process monitors a communication channel for messages comprising allocation data corresponding to a first discrete memory region and receives a message comprising the allocation data. The memory management process executes a memory management decision for the first discrete memory region based on the allocation data, wherein the first discrete memory region is not addressable by the processing device.

18 Claims, 5 Drawing Sheets

MEMORY MANAGEMENT IN A SYSTEM WITH DISCRETE MEMORY REGIONS

BACKGROUND

A large and growing population of users enjoys entertainment through the consumption of media items, including electronic media, such as electronic books (also referred to herein as ebooks), electronic newspapers, electronic magazines, digital audio and digital video. Users employ various electronic devices to consume such media items. Among these electronic devices are electronic book readers, cellular telephones, smartphones, personal digital assistants (PDAs), portable media players, tablet computers, netbooks, desktop computers, notebook computers, and the like.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
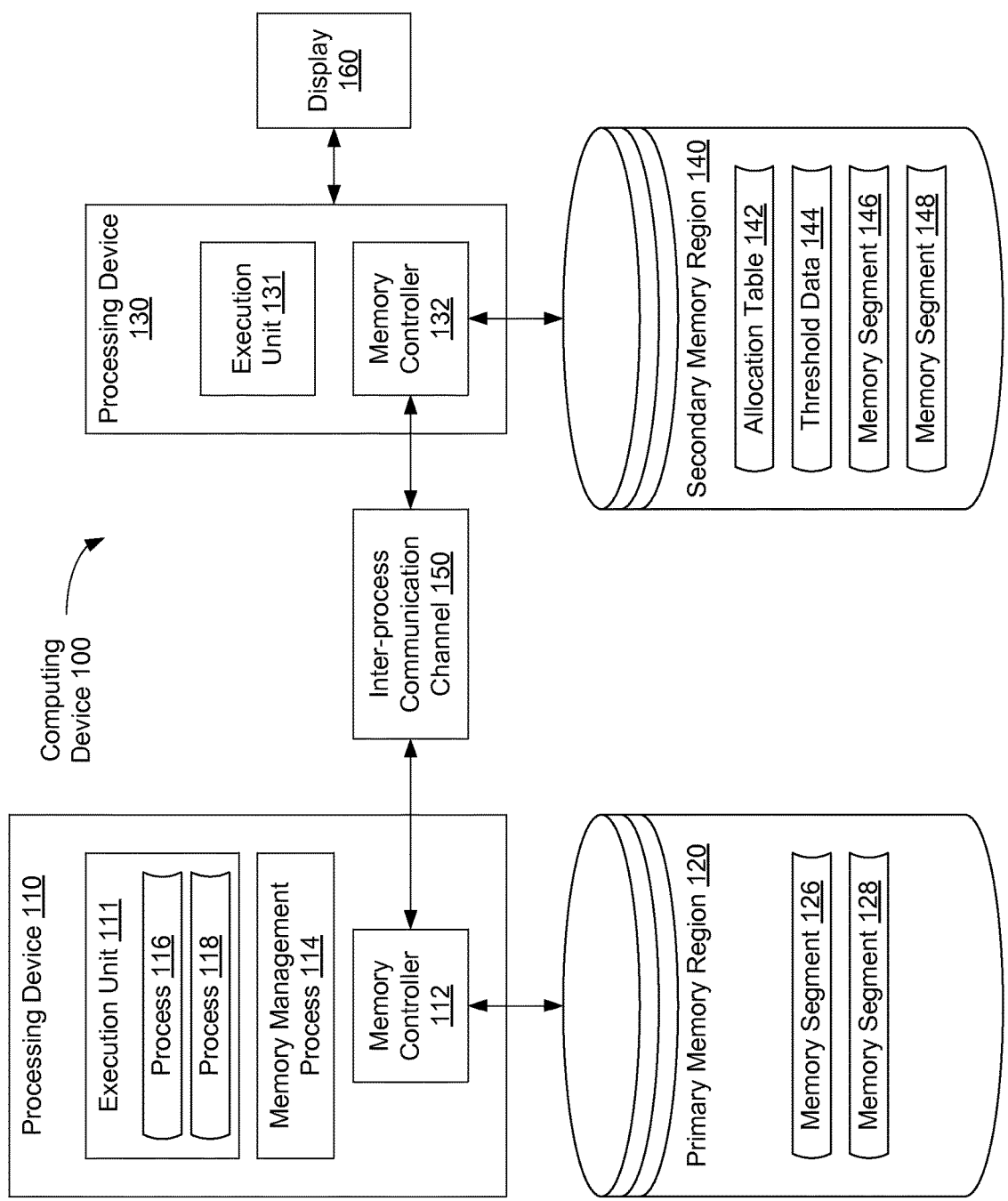
FIG. 1 is a block diagram illustrating a computing device with discrete memory regions, according to an embodiment.

Embodiments are described for memory management in a system with discrete memory regions. The amount of internal memory installed on modern devices can significantly impact manufacturing costs and retail pricing. If manufacturers can reduce the amount of memory on a device without degrading the customer experience, they may gain a competitive edge in pricing and value. Despite desires to reduce the amount of memory, customers demand at least the same or an improved level of performance to which they have become accustomed.

In attempt to reduce the amount of memory on a device, while still maintaining the desired levels of performance, on certain devices, the physical memory may be divided into two discrete memory regions. In one embodiment, these regions include a first primary memory region addressable by the primary or central processing device of the system and a secondary memory region addressable by a second processing device of the system. In one embodiment, the second processing device is a graphics processing device and the secondary memory region is a dedicated graphics memory region. For ease of explanation, throughout the remainder of this document, reference will be made to a graphics processing device and a graphics memory region. It should be understood, however, that the description may apply equally to any other processing device or memory region that are not necessarily dedicated for use in graphics processing.

In one embodiment, the primary memory region is used for the storage of data corresponding to execution of the operating system (e.g., Android™) and applications running on the device. Application processes running on the central processing device request generic memory allocations in the primary memory region using system calls such as malloc. The graphics memory region, however, is used for the storage of data corresponding to graphics processing (e.g., OpenGL® textures, video decoder buffers). Messages may be passed from the central processing device to the graphics processing device, which allocates memory segments in the discrete graphics memory region.

In one embodiment, the discrete memory regions are not addressable by other processing devices in the system. For example, the central processing device, which executes the operating system and its included memory management processes, cannot address the graphics memory region to ascertain the state of the graphics memory region and make memory management decisions for the graphics memory region. Thus, in one embodiment, a memory controller on the graphics processing device maintains an allocation table that reflects the memory allocations made in the graphics memory region and the corresponding processes that requested those memory allocations. Upon occurrence of a certain condition, such as the total amount of memory allocated in the graphics memory region reaching some defined threshold, the memory controller may transmit allocation data from the allocation table to the central processing device via an inter-process communication channel between the two, so that the memory management processes of the underlying operating system can act on information from both discrete memory regions on the computing device. This enables the central processing device to make memory management decisions based on both a current state of the primary memory region and a current state of the graphics memory region. As a result, a total amount of system memory may be reduced without impacting a user experience.

FIG. 1 is a block diagram illustrating a computing device with discrete memory regions, according to an embodiment. In one embodiment, the computing device 100 includes processing device 110, primary memory region 120, processing device 130, secondary memory region 140, inter-process communication channel 150 and display device 160. In one embodiment, the physical memory of computing device 100 is divided into two discrete memory regions. These regions include primary memory region 120 and secondary memory region 140. In one embodiment, primary memory region 120 is used for the storage of data corresponding to execution of an operating system (e.g., Android®, iOS®, OS X®, Windows® operating system, etc.) and applications running on the device, while secondary memory region 140 is used for the storage of data corresponding to graphics processing performed on computing device 100. As discussed above, secondary memory region 140 may be referred to herein as graphics memory region 140 for ease of explanation. In one embodiment, regions 120 and 140 are logical separated regions of the same physical memory device. In other embodiments, regions 120 and 140 are each part of separate physical memory devices in computing device 100. In one embodiment, processing device 110 and processing device 130 (also referred to herein as graphics processing device 130) are connected via inter-process communication channel 150. Computing device 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

Processing device 110 and graphics processing device 130 may be, for example, single-core processors or multi-core processors including multiple cores. These cores may be physical processors, and may include various components such as front end units, execution units and back end units. Processing device 110 may represent one or more general-purpose processing devices such as a microprocessor, central processing unit (CPU), or the like. Graphics processing device 130 may represent one or more special-purpose processing devices such as a graphic processor unit (GPU), an application specific integrated circuit (ASIC), a field programmable gate array (FPGA), a digital signal processor (DSP), network processor, or the like. Processing device 110 and graphics processing device 130 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 and graphics processing device 130 may be configured to execute processing logic for performing the operations discussed herein.

In this illustrated embodiment, processing device 110 and graphics processing device 130 each include one or more execution units 111, 131 to implement algorithms that are to perform at least one instruction. One embodiment may be described in the context of a multiprocessor mobile system, but alternative embodiments may be included in a desktop or server system. Processing device 110 and graphics processing device 130 may be coupled to a processor bus that transmits data signals between the processing device 110, graphics processing device 130 and other components in the device 100.

Execution units 111 and 131 may include logic to perform integer and floating point operations. The processing device 110 and graphics processing device 130, in one embodiment, include a microcode (ucode) ROM to store microcode, which when executed, is to perform algorithms for certain macroinstructions or handle complex scenarios. Here, microcode is potentially updateable to handle logic bugs/fixes for processing device 110 and graphics processing device 130. For one embodiment, execution units 111 and 131 include logic to handle a packed instruction set. By including the packed instruction set in the instruction set of a processing device, along with associated circuitry to execute the instructions, the operations used by many multimedia applications may be performed using packed data in a general-purpose processing device. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

In one embodiment, processing device 110 and graphics processing device 130 additionally include memory controllers 112 and 132. Memory controllers 112 and 132 can manage the flow of data going to and from primary memory region 120 and graphics memory region 140, respectively. For example, memory controller 112 can receive and process memory access requests from client devices, or from processes 116, 118 executing in execution unit 111 of processing device 110. In addition, memory controller 112 can retrieve requested data from memory segments 126, 128 in primary memory region 120 and provide the data to the requesting client or process. In this embodiment, memory controller 112 is illustrated as being part of processing device 110. In other embodiments, however, memory controller 112 can be a separate chip or integrated into a different chip within computing device 100. For example, in another embodiment, memory controller 112 may be connected externally to processing device 110 (e.g., across inter-processes communication channel 150). In other embodiments, memory controller 112 and the memory clients can be connected in some other fashion. Similarly, memory controller 132 can receive and process memory access requests from client devices, or from processes 116, 118 executing in execution unit 111 of processing device 110. Memory controller 132 can allocate and retrieve data from memory segments 146, 148 in graphics memory region 140. In this embodiment, memory controller 132 is illustrated as being part of graphics processing device 130. In other embodiments, however, memory controller 132 can be a separate chip or integrated into a different chip within computing device 100.

Primary memory region 120 and graphics memory region 140 may include a main memory, such as read-only memory (ROM), flash memory, dynamic random access memory (DRAM) (such as synchronous DRAM (SDRAM) or Rambus DRAM (RDRAM), etc.), or a static memory, such as flash memory, static random access memory (SRAM), etc. In other embodiments, primary memory region 120 and graphics memory region 140 may include some other type of storage device for storing information in a form (e.g., software, processing application) readable by a machine (e.g., a computer). The storage device may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

Graphics processing device 130 may include electronic circuitry found in or associated with video or other graphics circuitry. Graphics processing device 130 may couple an image memory, using memory segments 146, 148 as a video decoder buffer, or other image source data to a display device 160 such that video or image data is processed and properly formatted for the particular display device 160. Graphics processing device 130 may be used to convert image data that is retrieved from graphics memory region 140 into digital video or graphic display data that can ultimately be provided to display device 160. Display device 160 may include substantially any graphic display device along with its immediate circuitry. Examples of display devices include televisions, CRT devices, LCD display panels, LED display panels, mobile device display screens, consumer product display screens, OLED displays, projection displays, laser projection displays and 3D display devices. Display device 160 may be any output device used to present information for visual, and in some circumstances, tactile or audio reception.

In one embodiment, inter-process communication channel 150 connects memory controller 112 of processing device 110 to memory controller 132 of graphics processing device 130 and optionally one or more other clients. In one embodiment, inter-process communication channel 150 can include either a physical transmission medium such as wires and multiplexing arbiters, or a logical connection over a multiplexed medium such as a radio channel. Inter-process communication channel 150 is used to convey information, for example a digital bit stream, from one or several senders (or transmitters) to one or several receivers. Inter-process communication channel 150 may have a certain capacity for transmitting information, often measured by its bandwidth in Hertz or its data rate in bits per second. In general, communicating data from one location to another requires some form of pathway or medium. Inter-process communication channel 150 may form this pathway and may include a cable (e.g., twisted-pair wire, cable, fiber-optic cable) and/or a broadcast medium (e.g., microwave, satellite, radio, infrared). In one embodiment, inter-process communication channel 150 may be shared my multiple client devices, including processing device 110 and graphics processing device 130. Inter-process communication channel 150 may utilize a set of methods for the exchange of data among multiple threads in one or more processes. Processes may be running on one or more devices (e.g., processing device 110 and graphics processing device 130) connected by a channel 150. Inter-process communication methods may include methods for message passing, synchronization, shared memory, and remote procedure calls (RPC). The method of inter-process communication used may vary based on the bandwidth and latency of communication between the threads, and the type of data being communicated.

In one embodiment, the processing device 110 of computing device 100 executes the operating system, which includes memory management process 114. Since memory management process 114 is executed by processing device 110, the process 114 has direct access to primary memory region 120 and is able to obtain state information pertaining to primary memory region 120 and make corresponding memory management decisions. These memory management decisions may include, for example, whether to trim the amount of memory allocated in primary memory region 120 to any particular process, whether to stop execution of a process that requested memory allocation in primary memory region 120, whether to deallocate memory segments in primary memory region 120 in order to make more memory space available, or other memory management decisions.

Nevertheless, since graphics memory region 140 is only addressable by graphics processing device 130, memory management process 114 running on processing device 110 may not be able to address graphics memory region 140 to ascertain the state of graphics memory region 140 and make memory management decisions for graphics memory region 140. In one embodiment, memory controller 112 on processing device 110 may not be electrically connected to graphics memory region 140 and therefore cannot access or address any memory locations in graphics memory region 140. By having each memory controller only able to address one of the memory regions the overall cost and complexity of computing device 100 may be reduced. In one embodiment, even if memory controller 112 and graphics memory region 140 are electrically connected, memory controller 112 may still not be able to address memory locations in graphics memory region 140. In one embodiment, memory controller 112 is not able to translate virtual memory addresses to actual physical memory addresses in graphics memory region 140, and therefore is not able to "map" to memory addresses in graphics memory region 140. As a result, graphics memory region 140 may only be addressable by memory controller 132.

In one embodiment, memory controller 132 on graphics processing device 130 maintains allocation table 142 that reflects the memory allocations made in graphics memory region 140 and the corresponding processes that requested those memory allocations. Alternatively, memory controller 132 may maintain another type of data structure or file that contains the memory allocation information. For example, memory controller 132 may maintain a list, a comma separated values (CSV) file, and so on. Upon occurrence of a certain condition, such as the total amount of memory allocated in graphics memory region 140 reaching some defined threshold, memory controller 132 may transmit memory allocation data from the allocation table 142 (or other data structure or file) in graphics memory region 140 or associated with graphics memory region 140 to processing device 110 via inter-process communication channel 150 between the two, so that memory management process 114 can act on information from both primary memory region 120 and graphics memory region 140 to make appropriate memory management decisions.

In one embodiment, memory controller 132 of graphics processing device 130 receives a request for allocation of a memory segment in graphics memory region 140. In one embodiment, the request is received from processing device 110 on behalf of a process 116 executing on processing device 110. In one embodiment, the request includes a process identifier associated with the request that indicates the process 116 that issued the request. Memory controller 132 allocates a memory segment 146 in graphics memory region 140 in response to the request. In one embodiment, memory controller 132 records an indication of the memory segment as allocation data stored in allocation table 142 in graphics memory region 140. Memory controller 132 monitors that state of graphics memory region 140 and determines whether a total amount of memory allocated in graphics memory region 140 has reached a memory threshold. In one embodiment, the memory threshold is stored as threshold data 144 in graphics memory region 140. In response, the memory controller 132 may transmit the allocation data from allocation table 142 to processing device 110.

Figure 2:
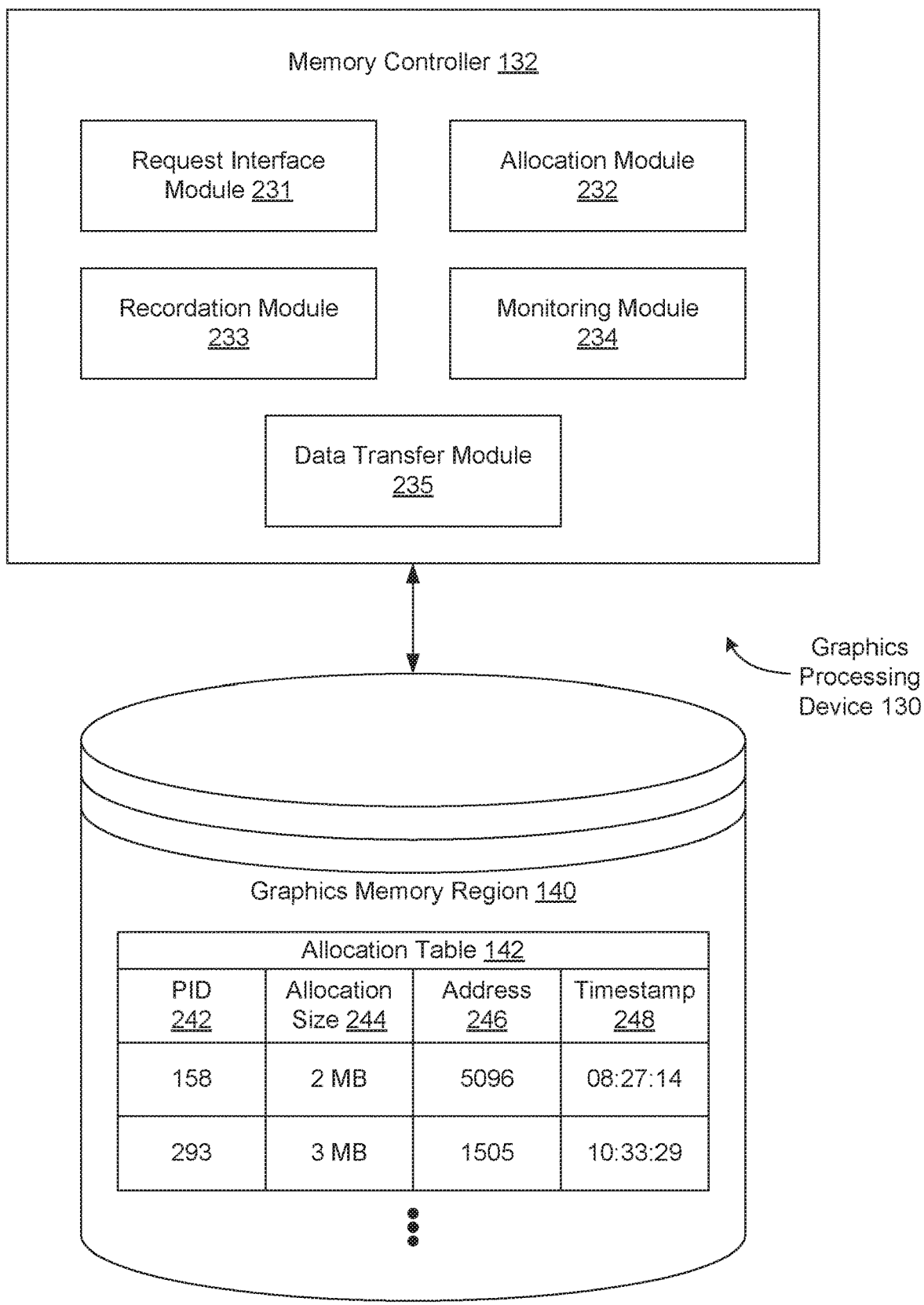
FIG. 2 is a block diagram illustrating a memory controller, according to an embodiment.

FIG. 2 is a block diagram illustrating a memory controller 132 that is included in graphics processing device 130, according to an embodiment. In one embodiment, memory controller 132 includes request interface module 231, allocation module 232, recordation module 233, monitoring module 234, and data transfer module 235. This arrangement of modules and components may be a logical separation, and in other embodiments, these modules or other components can be combined together or separated in further components, according to a particular embodiment. In one embodiment, graphics memory region 140 is connected to graphics processing device 130 and includes allocation table 142. In one embodiment, computing device 100 may include both graphics processing device 130 and graphics memory region 140. In another embodiment, graphics memory region 140 may be external to computing device 100 and may be connected to computing device 100 over a network or other connection. In other embodiments, memory controller 132 may include different and/or additional components which are not shown in order to simplify the description.

In one embodiment, request interface module 231 receives a request for allocation of a memory segment in graphics memory region 140. In one embodiment, the request is received from processing device 110 on behalf of a process 116 executing on processing device 110. In one embodiment, the request includes a process identifier associated with the request that indicates the process 116 that issued the request. In one embodiment, the process 116 that issued the request for the allocation of the memory segment comprises a video decoder buffering process, and the memory segment comprises a video decoder buffer. For example, when audio or video data is stored in a network storage location (e.g., in the cloud), it may be downloaded onto the device before playback. In one embodiment, techniques may be used to virtually expand a device's data storage capacity by transparently using external storage to give the perception that all media is always available and ready to launch. By predicting what media segments are likely to be requested, the system can pre-buffer those segments in graphics memory region 140 to give the appearance of near instantaneous availability.

In one embodiment, allocation module 232 allocates a memory segment 146 in graphics memory region 140 in response to the request. The request may include a size of the requested memory segment and allocation module 232 may locate a memory segment of sufficient size and allocate that segment for use by the requesting process. In one embodiment, the allocating comprises reserving a portion of graphics memory region 140 for dedicated use by the process 116 which issued the request. In one embodiment, allocation module 232 may maintain a table or other data structure indicating what physical memory addresses in graphics memory region are in use. In order to allocate a memory segment, allocation module 232 may lock, or otherwise mark as reserved, a specific range of memory addresses in order to prevent other processes from writing data to those addresses.

In one embodiment, recordation module 233 records an indication of the memory segment as allocation data stored in allocation table 142 in graphics memory region 140. For example, the allocation data stored in allocation table 142 may include a process identifier 242 associated with the request and a size 244 of the requested memory segment. In addition, the allocation data in allocation table 142 may include a memory address 246 of the allocated memory segment, a timestamp 248 indicating when the request for a memory allocation was received, and other data such as debugging information, etc. In one embodiment, each process that requests a memory allocation is assigned a process identifier (PID) 242, which may be, for example, a unique integer. In one embodiment, all of the memory allocations requested by the same process are stored in the same entry in allocation table 142. Thus, for an entry in allocation table 142 corresponding to the process identifier "158," the value for allocation size 244 may indicate that the total amount of memory allocated to the corresponding process is "2 MB," whether that was a single allocation or the aggregation of multiple allocations. In another embodiment, each entry in allocation table 142 may correspond to a separate memory allocation.

In one embodiment, monitoring module 234 monitors the state of graphics memory region 140 and determines whether a total amount of memory allocated in graphics memory region 140 has reached a memory threshold. In one embodiment, the memory threshold is stored as threshold data 144 in graphics memory region 140. In one embodiment, the memory threshold defines an amount of available memory space in graphics memory region 140. For example, the threshold may be set to 60 MB of free space remaining in graphics memory region 140. In one embodiment, the free space may be used to buffer frames of video. With 60 MB of free space, up to six frames of 1080P video may be stored. When switching from one video stream to another, there may be a time when frames from both streams are shown on the display at one time. If each stream is triple buffered, then at least six frames may be buffered at once. Consequently it may be desirable to reserve enough free space in graphics memory region 140 to maintain these buffers. In other embodiments, the threshold may be defined in terms of the total amount of memory allocated (e.g., 440 MB), a percentage of the graphics memory region 140 that has been allocated (e.g., 88%), or some other threshold.

In one embodiment, data transfer module 235 may transmit the allocation data from allocation table 142 to processing device 110 when the threshold is met. In one embodiment, data transfer module 235 pushes the allocation data to processing device 110 over inter-process communication channel 150. In one embodiment, data transfer module 235 sends a message containing the allocation data once per second as long as the threshold condition is still met. In another embodiment, data transfer module 235 transmits the allocation data to processing device 110 each time an update is made to allocation table 142.

Figure 3:
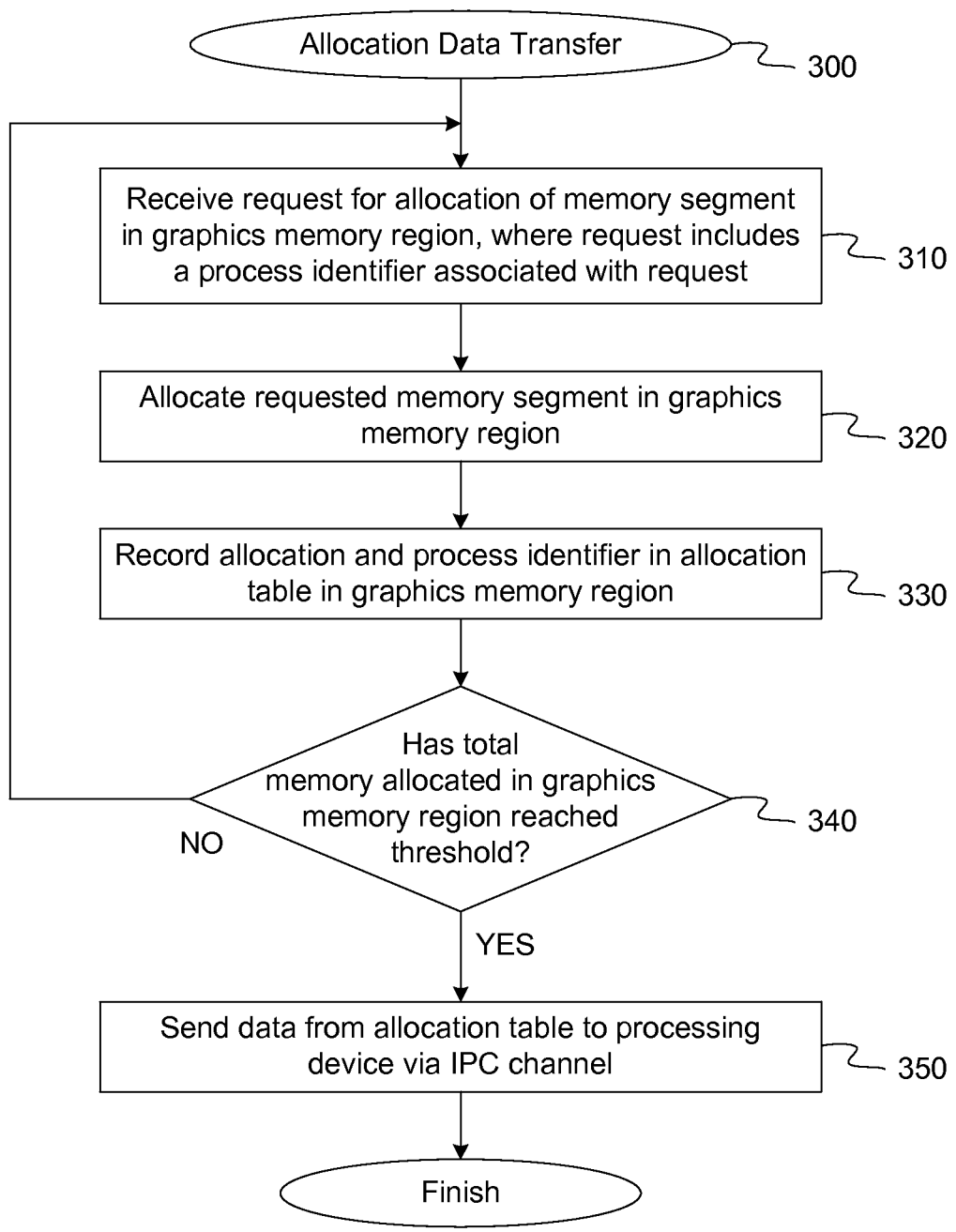
FIG. 3 is a flow diagram illustrating a memory allocation data transfer method, according to an embodiment.

FIG. 3 is a flow diagram illustrating a memory allocation data transfer method 300, according to an embodiment. The method 300 may be performed by processing logic that comprises hardware (e.g., circuitry, dedicated logic, programmable logic, microcode, etc.), software, firmware, or a combination thereof. The processing logic is configured to record memory allocation data in a particular memory region not addressable by a memory management process and transfer that allocation data to another memory region that is addressable by the memory management process, so that memory management decisions may be executed. In one embodiment, method 300 may be performed by memory controller 132 of graphics processing device 130, as shown in FIGS. 1 and 2.

Referring to FIG. 3, at block 310, method 300 receives a request for allocation of a memory segment in graphics memory region 140. In one embodiment, request interface module 231 receives the request from processing device 110 on behalf of a process 116 executing on processing device 110. In one embodiment, the request includes a process identifier associated with the request that indicates the process 116 that issued the request.

At block 320, method 300 allocates the requested memory segment in graphics memory region 140. In one embodiment, the request may include a size of the requested memory segment and allocation module 232 may locate a memory segment of sufficient size and allocate that segment for use by the requesting process. In one embodiment, the allocating comprises reserving a portion of graphics memory region 140 for dedicated use by the process 116 which issued the request.

At block 330, method 300 records the allocation and process identifier in allocation table 142 in graphics memory region 140. In one embodiment, recordation module 233 creates an entry in allocation table 142 and records an indication of the memory segment as allocation data stored in allocation table 142. In one embodiment, creating the entry includes generating a set of default fields (e.g., PID, Allocation Size, Address, Timestamp) that are initially set to null values. Recordation module 233 may set the corresponding value of each field using the allocation data received in the request. For example, the allocation data stored in allocation table 142 may include a process identifier 242 associated with the request and a size 244 of the requested memory segment. In addition, the allocation data in allocation table 142 may include a memory address 246 of the allocated memory segment, a timestamp 248 indicating when the request for a memory allocation was received, and other data such as debugging information, etc.

At block 340, method 300 determines whether the total memory allocated in graphics memory region 140 has reached a memory threshold. In one embodiment, monitoring module 234 monitors that state of graphics memory region 140 and determines whether a total amount of memory allocated in graphics memory region 140 has reached the memory threshold. In one embodiment, the memory threshold is stored as threshold data 144 in graphics memory region 140 and defines an amount of available memory space in graphics memory region 140.

If the total memory allocated in graphics memory region 140 has not reached the memory threshold, method 300 returns to block 310 and continues to receive new memory allocations. If the total memory allocated in graphics memory region 140 has reached the memory threshold, method 300 proceeds to block 350. At block 350, method 300 sends data from allocation table 142 to processing device 110 via inter-process communication channel 150. In one embodiment, data transfer module 235 may transmit the allocation data from allocation table 142 to processing device 110 when the threshold is met. In one embodiment, data transfer module 235 pushes the allocation data to processing device 110 over inter-process communication channel 150. In one embodiment, data transfer module 235 sends a message containing the allocation data once per second as long as the threshold condition is still met. In another embodiment, data transfer module 235 transmits the allocation data to processing device 110 each time an update is made to allocation table 142.

Figure 4:
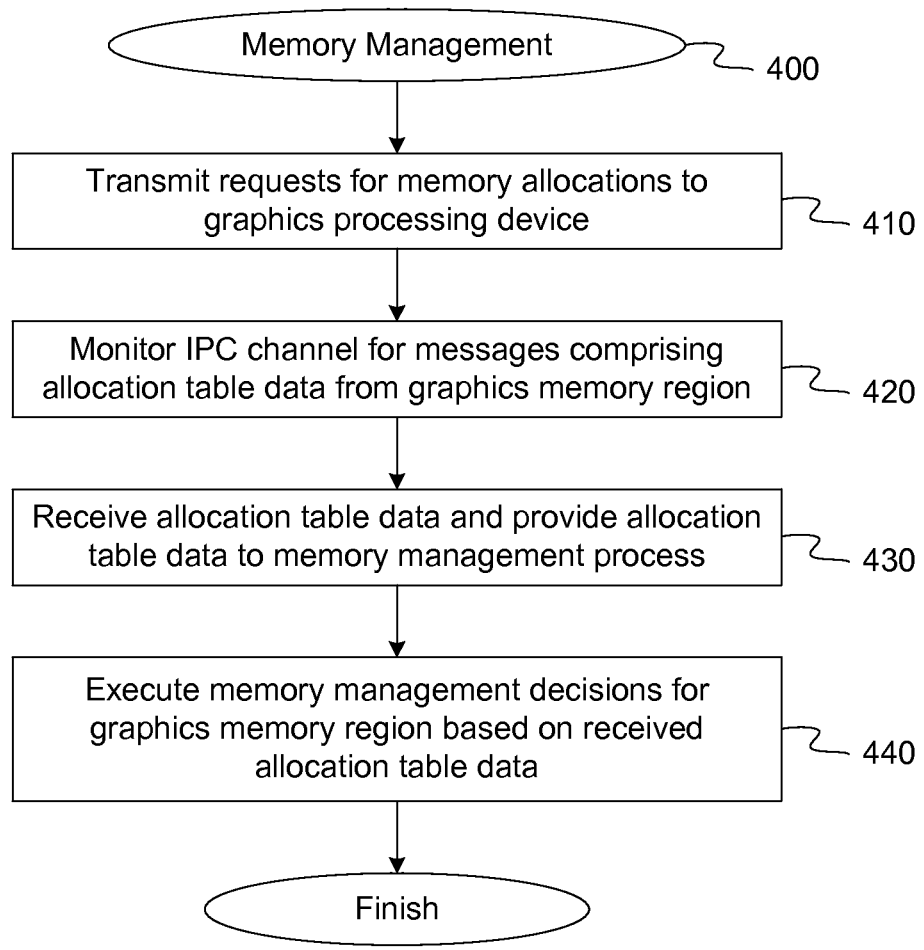
FIG. 4 is a flow diagram illustrating a memory management method for a system with discrete memory regions, according to an embodiment.

FIG. 4 is a flow diagram illustrating a memory management method 400 for a system with discrete memory regions, according to an embodiment. The method 400 may be performed by processing logic that comprises hardware (e.g., circuitry, dedicated logic, programmable logic, microcode, etc.), software, firmware, or a combination thereof. The processing logic is configured to execute memory management decisions for a discrete memory segment which is not normally addressable by the memory management process. In one embodiment, method 400 may be performed by memory management process 114, as shown in FIG. 1.

Referring to FIG. 4, at block 410, method 400 transmits requests for memory allocations to graphics processing device 130. Depending on the embodiment, the requests may be generated by client devices or from processes being executed by execution unit 111 of processing device 110. For example, a video decoder buffering process may be executing which determines media segments that are likely to be requested by a user for playback and preemptively caches those media segments from a remote storage source onto a local storage device. In this embodiment, the video decoder buffering process may make a memory allocation request for a memory segment in graphics memory region 140 in order to store the buffered media segments. In other embodiments, the memory allocation request may be generated by some other source.

At block 420, method 400 monitors inter-process communication channel 150 for messages containing allocation table data from graphics memory region 140. In one embodiment, memory management process 114 instructs memory controller 112 to monitor the messages received over inter-process communication channel 150 from graphics processing device 130. As described above, when certain conditions are met, memory controller 132 of graphics processing device 130 may send a message including allocation data from allocation table 142. These messages may have a specific format, identifier, or may be otherwise recognizable by memory controller 112 as including allocation data for graphics memory region 140.

At block 430, method 400 receives allocation table data and provides the allocation table data to memory management process 114. In one embodiment, when memory controller 132 recognizes a message received over inter-process communication channel 150 as including allocation data for graphics memory region 140, memory controller 132 may notify memory management process 114 that the message was received and provide the allocation data from the message to memory management process 114.

At block 440, method 400 executes memory management decisions for graphics memory region 140 based on the received allocation table data. In one embodiment, the central processing unit of computing device 100 executes the operating system, which includes memory management process 114. Memory management process 114 normally only has access to primary memory region 120, but since allocation data for graphics memory region 140 is received from graphics processing device, in one embodiment, memory management process 114 can make decisions about both primary memory region 120 and graphics memory region 140. These memory management decisions may include, for example, whether to trim the amount of memory allocated in graphics memory region 140 to any particular process, whether to stop execution of a process that requested memory allocation in graphics memory region 140, whether to deallocate memory segments in graphics memory region 140 in order to make more memory space available, or other memory management decisions. In one embodiment, memory management process 114 may consider the particular process that is associated with an allocated memory segment when making a memory management decision. For example, certain processes may have a higher priority, such that their memory allocations are protected (e.g., not trimmed or deallocated in favor of other lower priority processes). In another embodiment, memory management process 114 may determine and consider whether a user is currently interacting with a particular process. For example, If a particular process is currently executing and displaying content that is being viewed by a user, the priority of that process may be temporarily increased, until the user is no longer interacting with the process. In one embodiment, the priority of a given process is measured using an out-of-memory (OOM) score maintained by the operating system (e.g., Android™). In one embodiment, a lower OOM score indicates that the process is currently being interacted with (e.g., showing a user interface) and should be given a higher priority, while a higher OOM score means that the process is running in the background and can be given a lower priority. In other embodiments, the process priority may be measured in some other way.

Figure 5:
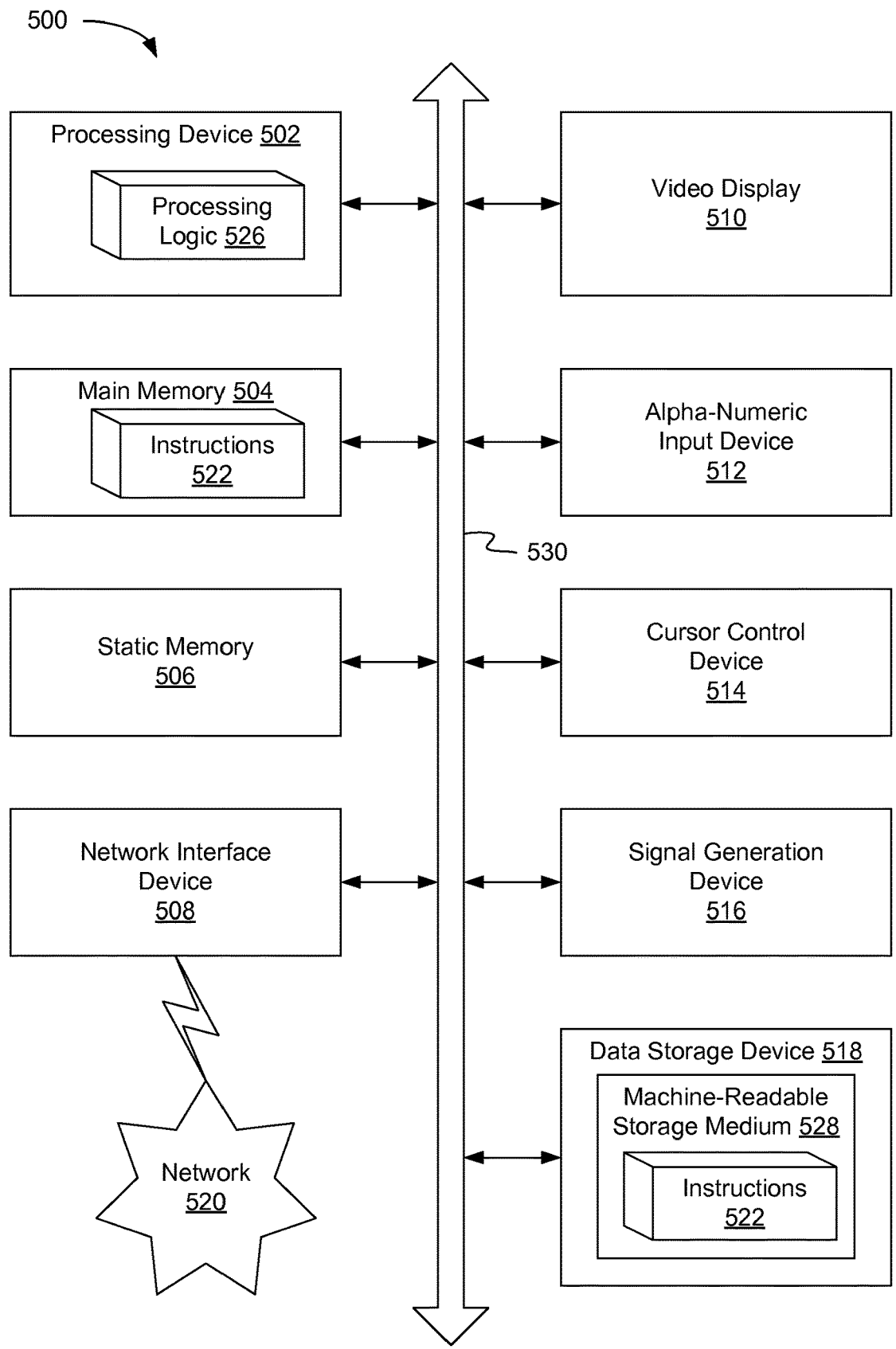
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. The system 500 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of computing device 100.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 embodying any one or more of the methodologies or functions described herein. The instructions 522 may also reside, completely or at least partially, within the main memory 504 and/or within processing logic 526 of the processor 502 during execution thereof by the computer system 500, the main memory 504 and the processor 502 also constituting computer-readable media. The instructions may further be transmitted or received over a network 520 via the network interface device 508.

While the computer-readable storage medium 528 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
executing a process on a central processing device in a computing device comprising a primary memory region and a graphics memory region;
sending, by a first memory controller of the central processing device, a request to a graphics processing device for allocation of a memory segment in the graphics memory region, the request comprising an identifier of the process;
receiving, by a second memory controller of the graphics processing device, the request for allocation of the memory segment in the graphics memory region;
allocating, by the second memory controller, the memory segment in the graphics memory region for dedicated use by the process which issued the request;
creating, by the second memory controller, an entry in an allocation table for the graphics memory region, the entry comprising the identifier of the process and a size of the memory segment;
determining, by the second memory controller, that an amount of available memory in the graphics memory region has reached a memory threshold;
responsive to the amount of available memory in the graphics region, not addressable by the central processing device, having reached the memory threshold, sending, by the second memory controller able to address the graphics memory region, allocation data from the allocation table to the central processing device not able to address the graphics memory region, the allocation data comprising a process identifier of the process that currently has the memory segment allocated in the graphics memory region, an address of the memory segment, an indication of a time when the request for allocation of the memory segment was received, and a size of the memory segment, wherein the graphics memory region is not addressable by the central processing device to ascertain a state of the graphics memory region and make a memory management decision for the graphics memory region; and
executing, by the first memory controller, a memory management process, using the allocation data, to make the memory management decision for the graphics memory region to release space in the graphics memory region for use by other processes.

2. The method of claim 1, further comprising:
sending the allocation data to the central processing device via an inter-process communication channel.

3. The method of claim 1, wherein executing the memory management decision for the graphics memory region comprises:
determining that the process that issued the request for the allocation of the memory segment is a background processes, wherein the process is a background process if the process is not currently displaying a user interface, receiving user input, or being interacted with by another process; and
deallocating the memory segment.

4. The method of claim 1, wherein the process that issued the request for the allocation of the memory segment comprises a video decoder buffering process, and wherein the memory segment comprises a video decoder buffer.

5. A computing device comprising:
a memory comprising a first discrete memory region and a second discrete memory region; and
a first processing device comprising a first memory controller operatively coupled to the first discrete memory region and a second processing device comprising a second memory controller operatively coupled to the second discrete memory region, wherein the second discrete memory regions is addressable by the second processing device, and wherein the second discrete memory region is not addressable by the first processing device to ascertain a state of the second discrete memory region and determine a memory management decision for the second discrete memory region, the first processing device to:
receive, by the first memory controller of the first processing device, a message from the second processing device, over a communication channel
determine, by the first memory controller, that the message comprises allocation data corresponding to the second discrete memory region not addressable by the first processing device;
identify, by the first memory controller and from the allocation data a process identifier, an address of the memory segment, an indication of a time when a request for allocation of a memory segment was received, and an indication of a size of the memory segment allocated in the second discrete memory region that corresponds to the process identifier, the second processing device to send the message comprising the allocation data responsive to an amount of available memory in the second discrete region having reached a memory threshold; and
determine, by the first memory controller, the memory management decision for the second discrete memory region based on the allocation data.

6. The computing device of claim 5, further comprising:
the second processing device, wherein the second discrete memory region comprises a graphics memory region addressable by the second processing device.

7. The computing device of claim 6, wherein the second processing device is operatively coupled to the first processing device through the communication channel.

8. The computing device of claim 5, wherein the message comprising the allocation data corresponding to the second discrete memory region is received based at least in part on a total amount of memory allocated in the second discrete memory region reaching a memory threshold.

9. The computing device of claim 5, wherein to execute the memory management decision for the second discrete memory region, the first memory controller is to identify a memory segment to deallocate.

10. The computing device of claim 9, wherein to identify the memory segment to deallocate, the first memory controller is to determine that a process which requested allocation of the memory segment is not currently being interacted with.

11. The computing device of claim 5, wherein to execute the memory management decision for the second discrete memory region, the first memory controller to stop execution of a process that requested allocation of a memory segment in the second discrete memory region.

12. A method comprising:
receiving, from a first memory controller of a first processing device, a request for allocation of a memory segment in a discrete memory region, the request comprising a process identifier associated with the request;
allocating, by a second memory controller of a second processing device, the memory segment in the discrete memory region, wherein the discrete memory region is not addressable by the first processing device to ascertain a state of the discrete memory region and determine a memory management decision for the discrete memory region;

recording, by the second memory controller, an indication of the memory segment as allocation data;

determining, by the second memory controller, that a total amount of memory allocated in the discrete memory region has reached a memory threshold; and responsive to the total amount of memory allocated in the discrete memory region not addressable by the first processing device having reached the memory threshold, transmitting, by the second memory controller, the allocation data to the first processing device, the allocation data comprising the process identifier associated with the request, an address of the memory segment, an indication of a time when the request for allocation of the memory segment was received, and a size of the memory segment.

13. The method of claim 12, wherein the second processing device comprises a graphics processing device and the discrete memory region comprises a graphics memory region addressable by the graphics processing device.

14. The method of claim 12, wherein the process identifier is associated with a process, executed by the first processing device, that issued the request for allocation of the memory segment.

15. The method of claim 12, wherein the memory threshold defines an amount of available memory space in the discrete memory region.

16. The method of claim 12, wherein the allocation data is stored in an allocation table in the discrete memory region.

17. The method of claim 12, wherein the total amount of memory allocated in the discrete memory region comprises a plurality of memory segments, wherein a memory segment of the plurality of memory segments is associated with a process executing on the first processing device.

18. The method of claim 12, wherein the first processing device to determine a memory management decision for the discrete memory region based on the allocation data.

* * * * *